(No Model.)  W. REID.  4 Sheets—Sheet 1.
GRAIN SEPARATOR.
No. 526,200.  Patented Sept. 18, 1894.
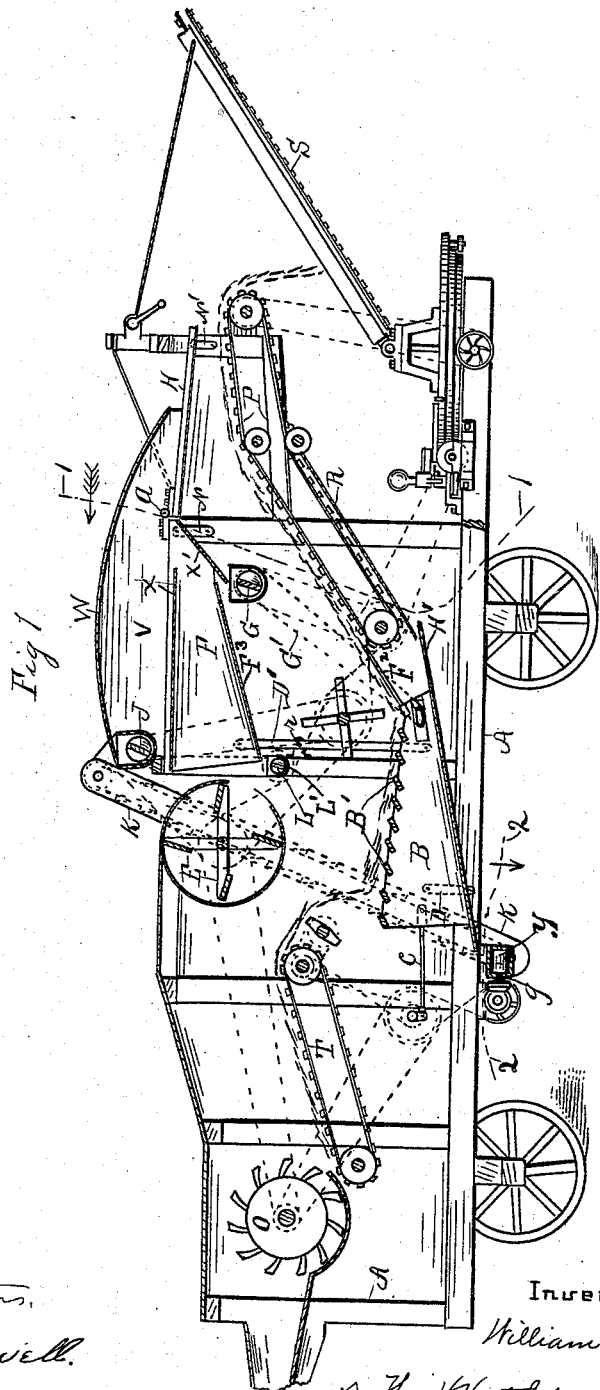
Witnesses:
Ray H Hutchins
Herbert Cowell
Inventor:
William Reid
By Thos H Hutchins Attorney.

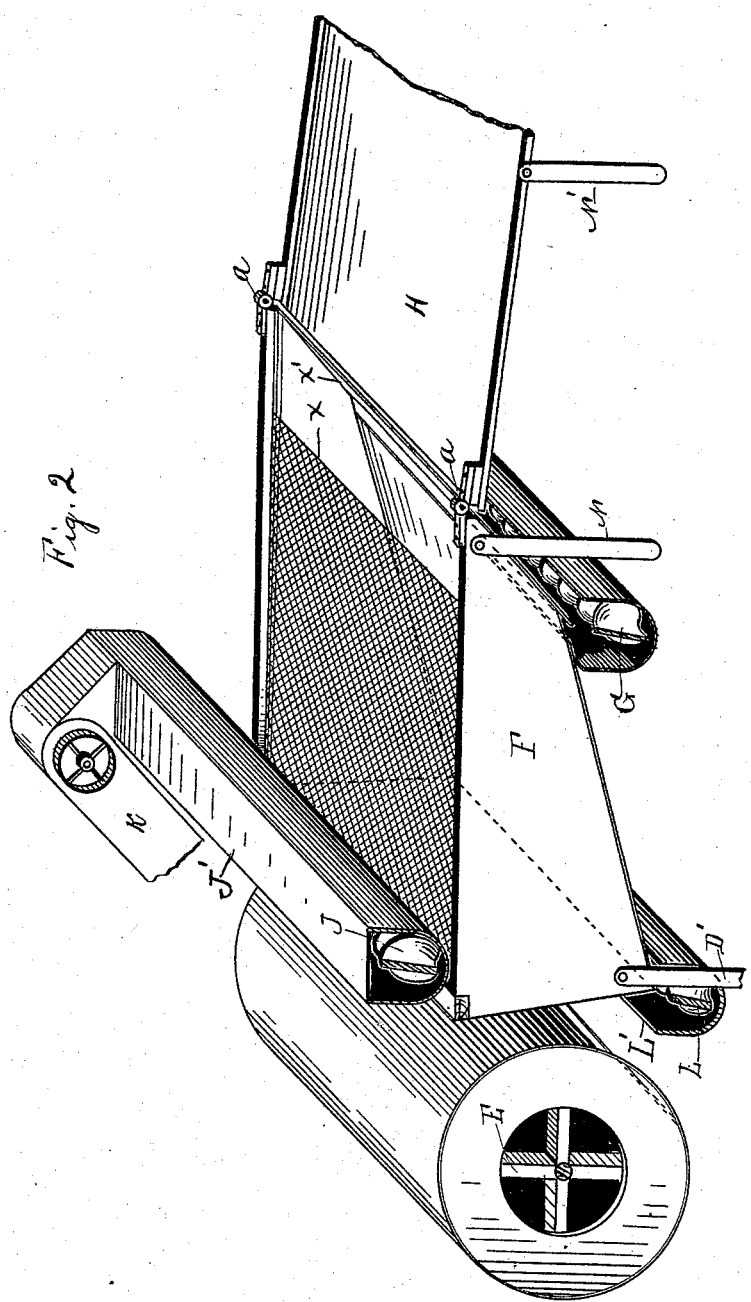

(No Model.)
W. REID.
GRAIN SEPARATOR.
No. 526,200.
4 Sheets—Sheet 3.
Patented Sept. 18, 1894.
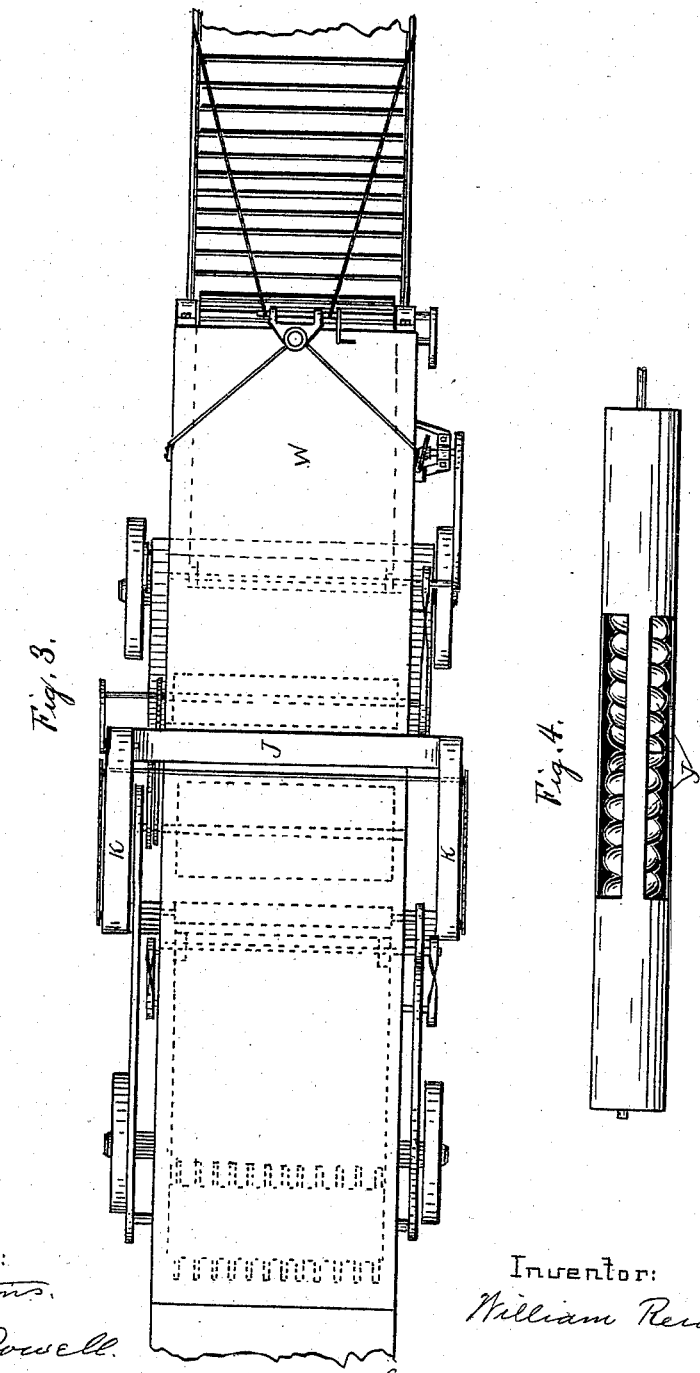
Witnesses:
Roy Hutchins
Herbert Cowell
Inventor:
William Reid
By Thos H Hutchins, Attorney.

(No Model.) 4 Sheets—Sheet 4.
W. REID.
GRAIN SEPARATOR.
No. 526,200. Patented Sept. 18, 1894.
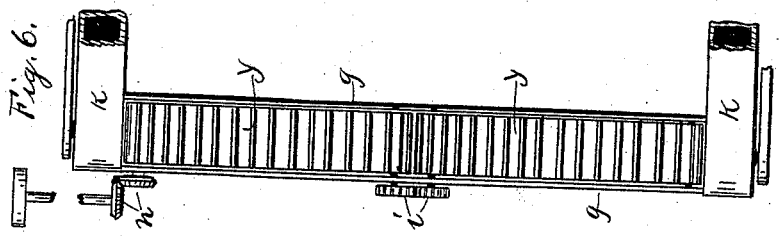
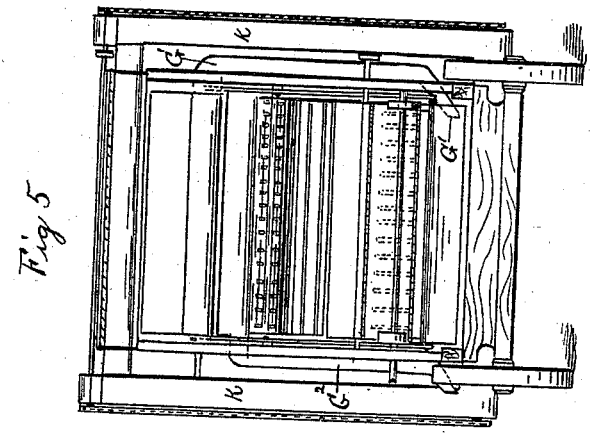
Witnesses
Ray Hutchins.
Herbert Powell.
Inventor
William Reid
By Thos H Hutchins  Attorney

United States Patent Office.

WILLIAM REID, OF DU PAGE, ILLINOIS.

GRAIN-SEPARATOR.

SPECIFICATION forming part of Letters Patent No. 526,200, dated September 18, 1894.

Application filed May 10, 1894. Serial No. 510,681. (No model.)

*To all whom it may concern:*

Be it known that I, WILLIAM REID, a citizen of the United States of America, residing at Du Page, in the county of Will and State of Illinois, have invented certain new and useful Improvements in Grain-Separators, of which the following is a specification, reference being had therein to the accompanying drawings and the letters of reference thereon, forming a part of this specification, in which—

Figure 1 is a central longitudinal section of the machine. Fig. 2 is a perspective view showing the fanning mill shoe, and a chaff board pivotally connected to its rear end the screw conveyers connected with said shoe, and the fan and its case. Fig. 3 is a top plan view of the entire machine. Fig. 4 is a bottom plan of the screw conveyer case and a portion of the screw therein for delivering the thrashed grain and chaff to the fanning mill shoe. Fig. 5 is a vertical cross section of Fig. 1 taken on line 1 looking in the direction of the arrow, and Fig. 6 is a plan view of the endless carrier conveyers for conveying grain as it leaves the cylinder to the conveyers leading to the fanning mill shoe.

This invention relates to certain improvements in grain separators, which improvements are fully set forth and explained in the following specification and claims.

Referring to the drawings, A represents the main frame of the machine mounted on truck wheels in the ordinary manner, and having a threshing cylinder O.

T is an endless canvas carrier having cross slats for conveying the thrashed grain and straw to the slats B' of the vibrating straw shoe B, between the slats of which the grain falls to the inclined floor H' and conveyed to the endless carrier $y$ in case $g$, shown in Figs. 1 and 6, while the straw is carried on over the tail board F² by means of a beater above it, to the endless slatted belt carrier P and delivered to the swinging straw stacker S, while any grain that may have been in the straw while on said carrier falls through to the inclined floor R and is carried to said carriers $y$.

K, K, are a pair of bucket elevators, one arranged at either side of the machine and leading from either end of the case $g$ of the endless conveyers $y$ up to case J' of the right and left screw conveyer J in said case shown in Figs. 2 and 4, said case J' being provided with slots in its lower side or bottom as shown in Fig. 4, so as to cause the grain to be evenly distributed on the sieve $x$ of the shoe F.

The shoe B is supported at its forward end on the upper ends of arms D pivotally connected at their lower ends to the inner side of the frame A, and its rear end is supported by the levers D' pivotally connected between its ends at $r$ to the inner side of the frame A, so that shoe B may be vibrated by means of a pitman C connected to some adjacent crank.

The forward end of the shoe F is supported by the upper ends of said levers D' by means of being pivotally connected thereto, and is supported at its rear end by means of the arms N having their lower ends pivotally connected to the frame A, and their upper ends pivotally connected to said shoe. The levers D' are pivotally connected between their ends at $r$ to the inner sides of the frame A, and as both shoes B and F are connected by means of said lever as shown the vibration of shoe B will cause shoe F to vibrate in the opposite direction. Shoe F is provided with a sieve $x$ and a tail board $x'$, and also an inclined floor F³ which conducts the cleaned grain to the screw conveyer L in its case L' arranged at the forward end of shoe F, from which the cleaned grain is delivered to sacks (or an adjacent receptacle).

H is a chaff floor pivotally connected at $a$ to the rear end of shoe F, and supported at its rear end on the arms N' in such manner that it will vibrate with said shoe, and extends to the rear end of the machine over the straw carrier P, so as to carry the chaff out of the machine to a swinging straw stacker S before it is mingled with the straw in the machine.

W is a cover for covering the shoe F and a greater portion of the chaff floor, to prevent escape of chaff until it reaches the rear part of the chaff floor.

The tail board $x'$ arrests and conducts grain that may escape over the end of the sieve $x$ and floor F³, to the screw conveyer G, by means of which it is conducted to spout G' and back to shoe B, from which it is elevated again, as before stated back to shoe F to be again cleaned by the fanning mill devices.

By such arrangement of parts it will be observed that the fan and its shoe and sieves are located in the upper part of the machine above the straw carrying devices, so that the straw while on its way through the machine is not subjected to a wind blast, which tends to pack it, and cause it to hold grain and chaff among it, and prevent it from being shaken out before it reaches the end of the machine. The straw passes through the machine loosely as it left the cylinder, and as a result about all the grain falls out of it through the carrier slats before it reaches the rear end of the machine, and the fan is relieved from having to blow a blast through a large amount of straw passing through the fanning mill shoe as in the ordinary machines of this character. The grain all having dropped from the straw is elevated to the fanning mill shoe as stated, and as there is no straw carried up with the grain to the fanning mill shoe, the fan only removes the chaff from the grain, the chaff being conducted by means of the chaff board H to the rear end of the machine and deposited on the endless straw stacker S with the straw. So that the principal improvements and advantages gained are in constructing the machine so as to relieve the straw while on its way through the machine from an air blast, and in having the fanning mill devices located in the upper part of the machine above the straw carriers so that the thrashed grain may be elevated to the fanning mill to be cleaned and the chaff be conducted out of the machine to the straw stacker direct without contact with the straw till it reaches the stacker. In Fig. 1 the various drive belts for driving the various parts are shown in broken lines on the opposite side of the figure.

Having thus described my invention, what I claim as new, and desire to secure by Letters Patent, is as follows:

1. In a grain separator the combination of the main frame A, shoe F having the sieve $x$ and tail board $x'$ and floor $F^3$, the chaff board H pivotally connected to the rear end of said shoe, the cover W, arms N and N', lever D', fan E, elevators K, screw conveyers G, L, and J, spout G', endless conveyers $y$, and the means for driving said elevators, endless straw carrying apron T, vibrating shoe B, endless straw carrier R all arranged to operate substantially as and for the purpose set forth.

2. In a grain separator the combination of the shoe F, fan E, cover W, and the chaff board H, pivotally connected to the rear end of said shoe and extending to the rear end of the machine all arranged to operate substantially as and for the purpose set forth.

WILLIAM REID.

Witnesses:
 THOS. H. HUTCHINS,
 RAY HUTCHINS.